Patented Feb. 16, 1943

2,311,531

UNITED STATES PATENT OFFICE 2,311,531

CATALYTIC ALKYLATION PROCESS

Stewart C. Fulton, Elizabeth, N. J., assignor to Standard Oil Development Company, a corporation of Delaware No Drawing. Application August 24, 1940, Serial No. 354,049

10 Claims. (Cl. 196—10)

The present invention relates to the production of saturated, branched chain hydrocarbons by reacting isoparaffinic hydrocarbons with olefins, in particular monoolefins, in the presence of novel alkylation catalysts. The products are normally liquid, saturated, branched chain hydrocarbons boiling chiefly within the motor fuel boiling range.

It is already known to condense isoparaffinic hydrocarbons preferably of the normally gaseous type with olefinic hydrocarbons, also preferably of the normally gaseous type, in the presence of various alkylation catalysts, promoters and activators. Catalysts heretofore used for bringing about such processes are concentrated sulfuric acid and other inorganic acids, the metal halides, in particular the aluminum halides, either alone or activated with hydrogen halides or combined as double salt complexes with alkali metal halides and similar compounds. The reaction conditions may vary considerably, depending upon the specific catalyst employed. The normally liquid hydrocarbons produced are found to be chiefly saturated in character and contain branched chain carbon structures in their molecules.

It is an object of the present invention to carry out the heretofore described alkylation reaction in the presence of novel alkylation catalysts to obtain the desired substantially completely saturated, branched chain, normally liquid hydrocarbons suitable for use as motor fuels or as blending agents for motor fuels in good yields. It is a further object of the invention to carry out the alkylation reaction in the presence of any one or several catalytic substances termed "ansolvo" acids.

In order to carry out the above-stated objects of the invention as well as others which will be apparent to those skilled in the art upon a fuller understanding of the following detailed description, isoparaffins are condensed with olefins, preferably monoolefins, to yield normally liquid, substantially completely saturated, branched chain hydrocarbons boiling within the motor fuel boiling range. The reaction is catalyzed or activated by the presence of the "ansolvo" acids. These acids are described in some detail by H. Meerwein in Justus Liebig's "Annalen der Chemie," vol. 455, pages 227 through 253. Definite chemical complex acids are thought to be formed by the union of various inorganic salts with organic compounds, or mixtures of organic carboxylic acids with inorganic salts; and inorganic salts in combination with various types of organic compounds including esters, alcohols, nitro compounds, ethers, ketones and the like. These latter type of complex "ansolvo" acids are usually referred to as "semi-ansolvo" acids. It appears that "ansolvo" acids have the property of intensifying or increasing the ionization of the acid used originally to form the complex ions. As examples of the "ansolvo" acids which may be employed in the present process as catalytic agents, the following may be mentioned: the complex acids produced by reacting organic carboxylic acids of the fatty acid series, for example, formic, acetic, propionic, butyric, oleic, naphthoic and the like, with various inorganic halides such as, for example, aluminum, boron, zinc, tin, and the like halides. "Ansolvo" acids wherein the inorganic halide is $AlCl_3$ are active alkylating catalyists. As examples of the "semi-ansolvo" acids there may be mentioned the complexes of the inorganic halides with ethers such as, for example, diethyl ether, ethyl phenol ether, and the like, the esters such as, for example, isobornyl acetate, pyroboric acetate, ethyl benzoate and the like, nitro compounds such as nitrobenzene, nitro-naphthalene, nitro-methane, nitro-ethane and the like, and alcohols such as, for example, isobornyl, glycerine, phenol, ethyl alcohol, propyl alcohol, isopropyl alcohol, dodecanol and the like. The said complex "ansolvo" acids contain the inorganic element in complex combination to such an extent that the hydrogen ions are intensified and attain an increased activity. For example, the addition of acetic acid to zinc chloride produces an organic acid which chemically behaves as though its structure were as follows: $(ZnCl_2.2C_2H_3O_2)H_2$.

As the reactants in the alkylation process, the isoparaffinic component may comprise isobutane, isopentane, and similar higher homologues containing at least one tertiary carbon atom per molecule, or mixtures of two or more of these isoparaffinic hydrocarbons may likewise be employed, particularly selecting the isoparaffinic components with reference to the desired final product, that is, as to whether or not aviation naphthas, safety fuels or motor fuels are desired. Olefinic reactants comprise ethylene, propylene, normal butylenes, isobutylene, trimethyl ethylene, the isomeric pentenes, and similar higher monoolefinic hydrocarbons of either a straight chain or branched chain structure. From an economic standpoint it is usually desirable to employ both isoparaffins and olefins which are normally gaseous. Normally liquid olefins as well as isoparaffins are, however, within the contemplation of this invention. Polymers, copolymers, interpolymers, and the like of the above-mentioned monoolefins may be employed as the olefinic reactant. Mixtures of two or more of the above-mentioned olefins may also be used. Various refinery gases such as C₃, C₄ and/or C₅ cuts from thermal and/or catalytic cracking units, field butanes which have been subjected to prior isomerization and/or partial dehydrogenation treatments, refinery stabilizer bottoms, spent gases and liquid products from catalytic polymerization and copolymerization processes are also contemplated as feed stocks for the present process. It is only essential that the feed stock to the process contain at least one isoparaffinic hydrocarbon containing at least one tertiary carbon atom per molecule and also contain at least one olefin, either normally gaseous or liquid. Diolefins such as, for example, butadiene may be present in small amounts or if desired they may form a major portion of the olefinic feed stock.

It is desirable, although not necessary, to employ a substantial molar excess of the isoparaffinic component or components of the feed stock since it has been found that increased yields of the desired saturated products are obtained thereby. This excess of isoparaffin with respect to the olefins in the reaction may range from between about 2:1 to as high as 30:1 or even higher. Equal molar portions of isoparaffin to olefin are, however, specifically contemplated although the desired results are less advantageous than when employing molar excesses of the isoparaffinc components.

The process may be carried out at temperatures ranging between about 30° F. and about 150° F., although it is preferred to carry out the reaction at temperatures of around 40–70° F. The process may be carried out in either the liquid or vapor phase. However, for economic reasons it is usually desirable to carry the process out under sufficient superatmospheric pressure to enable the reactants, catalysts and final products to be maintained in a liquid phase since this procedure is best adapted for effecting a continuous type of operation. The process may also be carried out batchwise. It is preferable, although not absolutely necessary, to effect quite intimate contact between the feed stock and the catalyst since the more intimate the contact the higher the yield of the desired saturated product attained. Vigorous mechanical stirring or shaking as well as various dispersion devices such as jets, porous thimbles, turbo mixers and the like may be employed. In a continuous process the partially spent catalyst may be separated from the reactant mixture and returned to the original reaction zone either separately or with unreacted reactants. The product produced is then treated with caustic to remove all traces of acid and fractionated to give the desired cuts.

No special type of apparatus is required for carrying out the process. The usual conventional polymerization or alkylation equipment has been found to be entirely satisfactory. It is desirable, however, in order to preserve the equipment, to construct the apparatus coming in contact with the catalyst of acid-resisting metals or to at least line the same with such materials. Thus, for example, the stainless steels are preferable to ordinary iron equipment since their corrosion resistance is much higher.

The length of time necessary for the reaction to reach substantial equilibrium and to produce high yields of products varies depending upon the various reaction conditions, reactants, catalyst strength and the like. In general, it is desirable to carry out the reaction with respect to any particular batch of fresh reactants for a period of between about 30 minutes and about 3.5 hours, the more drastic reaction conditions naturally requiring less total elapsed reaction time. In general, the preferred reaction time is between about 40 minutes and about 1.5 hours.

As illustrative of the process of the invention, but with no intention of limiting the invention thereto, the following examples are submitted:

Example 1

A catalyst was prepared by adding 340 grams of formic acid (87%) to 267 grams of boron trifluoride. To 607 grams of the resulting "ansolvo" acid there was added 360 grams of isopentane. This mixture was then intensively agitated at a temperature of about 70° F. and over a period of 40 minutes 94 grams of diisobutylene were slowly added. At the conclusion of the olefin addition, the reaction mixture was vigorously agitated for an additional 20 minutes, at the end of which time the normally liquid, substantially saturated product constituting the C₉ and heavier fraction was removed and it was found that the fraction was substantially completely saturated in character. Based upon the total olefin added, the saturated, normally liquid product obtained amounted to about 105% by weight yield.

Example 2

299 grams of acetic acid were added to 259 grams of boron trifluoride. To 558 grams of the resulting "ansolvo" acid 360 grams of isopentane were mixed. This solution was intensively agitated over a period of about 1 hour at 70° F., during the first 40 minutes of which 94 grams of diisobutylene were slowly added. At the conclusion of the 1 hour the agitation of the reaction mixture was stopped and 73.1 grams of a liquid, substantially saturated product were isolated.

The term, "ansolvo acids," as employed in the appended claims is intended to cover "ansolvo" acids of the type described and referred to as such by Meerwein, citation supra, and is also intended to include within its meaning the compounds referred to herein as "semi-ansolvo" acids.

The nature and objects of the invention having been thus fully described and illustrated, what is claimed as new and useful and desired to be secured by Letters Patent is:

1. A process for the production of normally liquid, substantially completely saturated, branched chain hydrocarbons which comprises alkylating at least one isoparaffin with at least one olefin in the presence of a catalyst of the type specified as "ansolvo" acids.

2. A process for the production of normally liquid, substantially completely saturated, branched chain hydrocarbons which comprises alkylating isoparaffin with mono-olefin in the presence of a catalyst of the "ansolvo" type, wherein one component of the acid is an inorganic halide while the other component is an organic acid.

3. A process as in claim 2 wherein the reaction is carried out with a substantial molar excess of isoparaffins with respect to the olefins and wherein the reactants are maintained substantially in the liquid phase under the conditions obtaining.

4. A process as in claim 2 wherein the reaction mixture is intensively agitated and the temperature is maintained between about 30° F. and about 150° F.

5. A process which comprises alkylating isobutane with at least one normally gaseous mono-olefin with vigorous agitation at a temperature between about 40° F. and about 70° F. for a period between about 0.5 and about 1.5 hours in the presence of an "ansolvo" acid formed from an inorganic halide and an organic acid.

6. A process as in claim 5 wherein the catalyst is an "ansolvo" acid formed by combining boron trifluoride with an organic monocarboxylic acid.

7. A process which comprises alkylating a refinery $C_4$ cut containing isobutane and butylenes under sufficient superatmospheric pressure to maintain the reactants in the liquid phase under the reaction conditions obtaining, with intensive agitation for a period of about 1 hour at a temperature of between about 40° F. and about 70° F. in the presence of an "ansolvo" acid formed by reacting boron trifluoride with acetic acid.

8. A process as in claim 7 wherein the catalyst is formed by reacting aluminum chloride with an organic monocarboxylic acid.

9. A process according to claim 7 wherein the catalyst is formed by reacting aluminum chloride with acetic acid.

10. A process which comprises alkylating isopentane with diisobutylene with intensive agitation at a temperature of about 70° F. for a period of about 1 hour in the presence of an "ansolvo" acid formed by reacting boron trifluoride with acetic acid and recovering the substantially completely saturated, branched chain, normally liquid hydrocarbon product from the reaction mixture.

STEWART C. FULTON.